(12) United States Patent
Zohar et al.

(10) Patent No.: US 7,490,213 B2
(45) Date of Patent: Feb. 10, 2009

(54) DYNAMIC ALLOCATION OF STORAGE FOR HIERARCHICAL COPIES

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL); Efri Zeidner, Kiryat Mozkin (IL)

(73) Assignee: XIV Ltd., Tel-Aviv (IL)

( * ) Notice: Subject to any disclaimer, the term of this patent is extended or adjusted under 35 U.S.C. 154(b) by 313 days.

(21) Appl. No.: 11/265,323

(22) Filed: Nov. 2, 2005

(65) Prior Publication Data

US 2006/0253681 A1 Nov. 9, 2006

Related U.S. Application Data

(63) Continuation-in-part of application No. 11/123,993, filed on May 6, 2005.

(51) Int. Cl.
*G06F 12/00* (2006.01)
(52) U.S. Cl. ...................................................... 711/173
(58) Field of Classification Search ................... 711/173
See application file for complete search history.

(56) References Cited

U.S. PATENT DOCUMENTS

| | | | |
|---|---|---|---|
| 5,897,661 A | 4/1999 | Baranovsky et al. | |
| 5,964,874 A * | 10/1999 | Gross et al. | 713/100 |
| 6,088,764 A | 7/2000 | Shyam et al. | |
| 6,513,102 B2 | 1/2003 | Garrett et al. | |
| 6,574,703 B1 | 6/2003 | Don et al. | |
| 6,687,718 B2 | 2/2004 | Gagne et al. | |
| 6,742,138 B1 | 5/2004 | Gagne et al. | |
| 6,779,094 B2 | 8/2004 | Selkirk et al. | |
| 6,779,095 B2 | 8/2004 | Selkirk et al. | |
| 6,820,099 B1 | 11/2004 | Huber et al. | |
| 6,839,827 B1 | 1/2005 | Beardsley et al. | |
| 6,898,681 B2 * | 5/2005 | Young | 711/162 |
| 2003/0195864 A1 | 10/2003 | Vishlitzky et al. | |
| 2003/0195887 A1 | 10/2003 | Vishlitzky et al. | |
| 2003/0208463 A1 | 11/2003 | Vishlitzky et al. | |

OTHER PUBLICATIONS

S. Kang and A.L. Reddy "Virtual Allocation: A Scheme for Flexible Storage Allocation" Proceedings of 1st Workshop of Oasis, Boston, MA, Oct. 2004.*

Sukwoo Kang, et. al., "Virtual Allocation: A Scheme for Flexible Storage Allocation", Department of Electrical Engineering, Texas A&M University, Oasis Workshop, Boston, Massachusetts, Oct. 9-13, 2004, available at http://ee.tamu.edu/~swkang/doc/va.pdf.

Paul R. Wilson, et. al., "Dynamic Storage Allocation: A Survey and Critical Review", Department of Computer Sciences, University of Texas at Austin, proceedings of the 1995 International Workshop on Memory Management, Kinrose, Scotland, UK, Sep. 27-29, 1995, Springer Verlag LNCS, available at http://www-2.cs.cmu.edu/afs/cs.cmu.edu/academic/class/15213-f98/doc/dsa.pdf.

* cited by examiner

*Primary Examiner*—Pierre-Michel Bataille
*Assistant Examiner*—John P Fishburn
(74) *Attorney, Agent, or Firm*—Katten Muchin Rosenman LLP

(57) ABSTRACT

A method for managing multiple logical volumes in a data storage system, including providing physical storage of a given capacity within the data storage system, and adding a logical volume of a given size within the data storage system so as to cause a total amount of logical storage of the logical volumes in the data storage system to be greater than the given capacity of the physical storage. The method includes verifying, in response to a write command to store data in the logical volume, that a physical storage location is available in the physical storage and, if the physical storage location is available, then storing the data at the physical storage location.

6 Claims, 5 Drawing Sheets

DYNAMIC ALLOCATION OF STORAGE FOR HIERARCHICAL COPIES

RELATED APPLICATIONS

This application is a continuation-in-part of application Ser. No. 11/123,993, titled "Data Storage Methods for Hierarchical Copies," filed May 6, 2005, which is incorporated herein by reference.

FIELD OF THE INVENTION

The present invention relates generally to methods and apparatus for data storage. More particularly, the present invention relates to methods and apparatus for managing multiple logical volumes in data storage systems.

BACKGROUND OF THE INVENTION

Data storage systems generally store data on physical media in a manner that is transparent to host computers. From the perspective of a host computer, data is stored at logical addresses located on file systems, or logical volumes. Logical volumes are typically configured to store the data required for a specific data processing application. Data storage systems map such logical addresses to addressable physical locations on storage media, such as direct access hard disks. In a typical configuration, physical locations comprise tracks on a hard disk. A track can typically store many blocks of data. System administrators frequently need to make copies of logical volumes in order to perform backups or to test and validate new applications. Data storage systems may implement the copying tasks without physically copying the data. Prior art for such implementation generally refers to the process as "instant copying." When a logical copy is made, data only needs to be written physically when a portion of one of the copies is modified.

U.S. Pat. No. 6,779,094 to Selkirk, et al., whose disclosure is incorporated herein by reference, describes various instant copy mechanisms for copying data upon receiving a write operation to either original or copy data. Upon receiving a write operation for writing new data to a first data location, new data is written to a second data location. Multiple layers of mapping tables provide unique identification of the storage location of the data such that individual entries in the mapping tables are variable and may be self-defining.

U.S. Pat. No. 6,779,095 to Selkirk, et al., whose disclosure is incorporated herein by reference, describes the use of a plurality of layers of mapping tables for storing data. The mapping tables provide unique identification of location of the data. When the data is copied, the physical placement of the original data is described by a mapping mechanism known as the original data map. This identifies the physical storage location used to store the original data. The physical placement of the copy data is described by a mapping mechanism known as the copy data map. This identifies the physical storage location used to store the copy data.

U.S. Patent Publications 2003/0195887 and 2003/0208463 to Vishlitzky, et al., whose disclosures are incorporated herein by reference, describe a storage device containing a first storage area of a first type containing data and a second storage area of a second type containing a table of pointers to data provided in the storage area of the first type. The second storage area is a virtual storage area containing no sections of data and represents a copy of data of the first storage area at a point in time.

U.S. Pat. No. 6,820,099 to Huber, et al., whose disclosure is incorporated herein by reference, describes the use of a snapshot volume to update a primary, or "base," logical volume. Updates are made to the snapshot volume while the base volume is still used to satisfy normal data access requests. After the updating of the snapshot is complete, the snapshot is rolled back to the base volume. During rollback, updated data are available from either the snapshot or from the base volume, and thus the updating appears to be instantaneous.

U.S. Pat. No. 6,687,718 to Gagne, et al., whose disclosure is incorporated herein by reference, describes transferring data from a data altering apparatus, such as a production data processing site, to a remote data receiving site. A data storage facility includes a first data store for recording each change in the data generated by the data altering apparatus. A register set records each change on a track-by-track basis. A second data store has first and second operating modes. During a first operating mode the second data store becomes a mirror of the first data store. During a second operating mode the second data store ceases to act as a mirror and becomes a source for a transfer of data to the data receiving site. Only information that has been altered, i.e., specific tracks that have been altered, are transferred during successive operations in the second operating mode.

U.S. Pat. No. 6,513,102 to Garrett, et al., whose disclosure is incorporated herein by reference, describes a system for transferring data from a first storage device, accessible to a first command processor, to a second storage device accessible to a second command processor but not necessarily to the first processor. In this aspect of the invention, the transfer is made internally of the storage controller rather than requiring the command processors to communicate directly with each other.

U.S. Pat. No. 6,742,138 to Gagne, et al., whose disclosure is incorporated herein by reference, describes a data recovery program that restores data in a first storage device using data from a second storage device. The program also updates the first storage device with data supplied from a host.

U.S. Pat. No. 6,574,703 to Don, et al., whose disclosure is incorporated herein by reference, describes a method for initializing an extent on a mass storage device having at least one track. The method preserves data in a track from being overwritten, and indicates that the data of the track is to be replaced. The method also associates an initialization code with the track indicating that the track is to be initialized.

U.S. Patent Publication 2003/0195864 to Vishlitzky, et al., whose disclosure is incorporated herein by reference, describes providing storage areas of a multiplicity of types that contain sections of data. Pointers are provided that are claimed to allow access or not to allow access to the data.

U.S. Pat. No. 6,839,827 to Beardsley, et al., whose disclosure is incorporated herein by reference, describes a method for mapping logical blocks to physical storage blocks. A storage controller defines the logical storage space as a sequence of logical chunks, wherein each logical chunk comprises a plurality of logical blocks in the logical storage space. The storage controller further defines a physical storage space as a sequence of physical chunks, wherein each physical chunk comprises a plurality of physical blocks in the physical storage system. The storage controller associates each logical chunk in the sequence of logical chunks defining the logical storage space with one physical chunk in the physical storage system. Further, the contiguous logical chunks are capable of being associated with non-contiguous physical chunks.

U.S. Pat. No. 6,088,764 to Shyam, et al., whose disclosure is incorporated herein by reference, describes a method for reducing space allocation failures in a computer system that utilizes direct access storage devices to store data. The method comprises the steps of determining if authorization has been given to attempt to allocate an initial space request over more than one volume, and, if so, attempting to allocate space on a plurality of volumes. If the initial space request cannot be allocated on a plurality of volumes, the initial space request is reduced by a preset percentage, an extent limit is removed and an attempt is made to allocate the reduced space request on the plurality of volumes.

U.S. Pat. No. 5,897,661 to Baranovsky, et al., whose disclosure is incorporated herein by reference, describes an apparatus providing a logical unit of undivided data storage that spans physical storage device boundaries. The apparatus manages the logical unit of undivided storage using metadata information stored on the physical storage devices. Advantageously, the apparatus replicates a minimum portion of the metadata information across all of the data storage devices and favors writing metadata only in the devices where the information is required to operate. In a preferred embodiment, a logical unit of undivided storage is created by defining a logical volume and allocating portions of available physical data storage devices thereto in order to provide a minimum logical volume size. Metadata is generated and stored on the data storage devices to provide detailed information about the portions of each data storage device that have been allocated to the logical volume.

A paper by Kang, et al., "Virtual Allocation: A Scheme for Flexible Storage Allocation," published at the OASIS Workshop, Boston, Mass., Oct. 9-13, 2004, and available at http://ee.tamu.edu/~swkang/doc/va.pdf, is incorporated herein by reference. The paper describes physical storage allocation strategies that provide large shared areas with virtual storage for multiple file systems.

A paper by Wilson, et al., "Dynamic Storage Allocation: A survey and critical review," published in Proceedings of the 1995 International Workshop on Memory Management, Kinrose, Scotland, UK, Sep. 27-29, 1995, Springer Verlag LNCS, and available at the website http://www-2.cs.cmu.edu/afs/cs.cmu.edu/academic/class/15213-f98/doc/dsa.pdf, is incorporated herein by reference. The paper covers techniques for dynamic allocation of physical storage, or heap storage.

SUMMARY OF THE INVENTION

Embodiments of the present invention provide efficient methods and apparatus for dynamic storage allocation in a data storage system that manages multiple logical volumes.

In embodiments of the present invention, a data storage system is coupled to physical storage media comprising a quantity of physical data blocks. The data storage system receives, typically from a management module, a command to define a first logical volume for storage of a first quantity of logical data blocks. Subsequently, the storage system receives, typically from a host computer, a first input/output (I/O) command to store data of the first logical volume. Assuming that sufficient data blocks for storing the data are available on the physical storage media, the storage system stores the data at locations on the physical storage media and creates links between the locations and one or more respective logical partitions of the first logical volume. The storage system uses partition descriptor records (PDRs) to define the links.

Subsequently, the storage system receives a management copy command to copy the first logical volume, referred to herein as a source volume, to a second logical volume, referred to herein as a target volume, for storage of a second quantity of logical data blocks. The sum of the first and second quantities of logical data blocks may be greater than the quantity of physical data blocks. In response to the command, the storage system links the first logical volume and the second logical volume as branch volumes of a meta-volume. The meta-volume linkage associates partitions of the second logical volume with physical locations linked to the first logical volume. No PDRs are created to define links between the second logical volume and physical locations. Consequently, the time required to copy the logical volume is virtually instantaneous and is completely independent of the size of the first and second logical volumes.

Subsequently, the storage system treats the first and second logical volumes as being independent of each other when performing I/O and management commands. When the data storage system receives a second I/O command to access data at a logical partition of the first volume or of the second volume, the data storage system uses a PDR linked to the meta-volume to identify the required physical location. Upon receiving a third I/O command to write data at a logical partition of the first volume or of the second volume, the storage system verifies that a sufficient quantity of free physical storage data blocks exist. If there is a sufficient quantity of free blocks, the storage system dynamically allocates a new physical storage location for storage of the data of the third I/O command and creates a new PDR. If free physical data blocks do not exist, then the storage system returns an error message. With dynamic allocation of physical storage, physical storage media of a limited size is thus configured in an efficient manner to store logical volume data that may represent a far greater size.

There is therefore provided, according to an embodiment of the present invention, a method for managing multiple logical volumes in a data storage system, including:

providing physical storage of a given capacity within the data storage system;

adding a logical volume of a given size within the data storage system so as to cause a total amount of logical storage of the logical volumes in the data storage system to be greater than the given capacity of the physical storage;

responsively to a write command to store data in the logical volume, verifying that a physical storage location is available in the physical storage; and if the physical storage location is available, then storing the data at the physical storage location.

Typically, adding the logical volume includes forming meta-data having a size that is independent of the given size of the logical volume.

In an embodiment, storing the data includes:

allocating a quantity of physical storage tracks; and creating a quantity of partition descriptor records (PDRs), such that the quantity of physical storage tracks is approximately proportional to the quantity of PDRs.

The ratio of the quantity of physical storage tracks to the quantity of PDRs may be approximately equal to a constant.

The method typically includes, responsively to a read command, accessing the data at the physical storage location using at least one of the PDRs. The method also typically includes, wherein the data includes first data, wherein the logical volume includes a first logical volume, receiving a read command to access second data in a second logical volume; and responsively to the read command, accessing the second data at the physical storage location using at least one of the PDRs.

In one embodiment the second logical volume is a copy of the first logical volume and wherein the second data includes a copy of the first data.

In an alternative embodiment, the method includes
linking the first logical volume and the second logical volume with a meta-volume; and
using the meta-volume to access the second data responsively to the read command.

In some embodiments, the physical storage location includes a first physical storage location, wherein the write command is a first write command and the method includes, responsively to a second write command:
using at least one of the PDRs to access the data;
modifying the data according to the second write command;
verifying that a second physical storage location exists; and
storing the modified data at the second physical storage location.

Typically, verifying that the physical storage location is available includes determining that there is insufficient space in the physical storage and returning an error message to one or both of a host computer and a management module.

There is further provided, according to an embodiment of the present invention, a method for managing multiple logical volumes in a data storage system, including:
providing physical storage of a given capacity within the data storage system; and
responsively to a command to form a logical volume of a given size, adding a logical volume within the data storage system, allocating to the logical volume an amount of physical storage less than the given amount of logical storage, and forming meta-data having a size that is independent of the size of the logical storage.

Typically, allocating the amount of physical storage responsively to the command to form the logical volume includes allocating no physical storage.

In a disclosed embodiment, the method includes, responsively to a write command to store data in the logical volume, verifying that a physical storage location is available in the physical storage; and
if the physical storage location is available, then storing the data at the physical storage location.

Storing the data at the physical storage location may include:
creating a partition descriptor record (PDR) that links the data with the physical storage location; and
responsively to a read command, accessing the data at the physical storage location using the PDR.

The data may include first data, wherein the logical volume includes a first logical volume, wherein the read command includes a first read command, and the method may include:
receiving a second read command to access second data in a second logical volume; and
responsively to the second read command, accessing the second data at the physical storage location using the PDR.

There is further provided, according to an embodiment of the present invention, a method for managing multiple logical volumes in a data storage system, including:
providing physical storage of a given capacity within the data storage system;
responsively to a command to form a logical volume of a given size, adding the logical volume within the data storage system without allocating physical storage;
responsively to a write command to store data in the logical volume, verifying that a physical storage location is available in the physical storage; and
if the physical storage location is available, then storing the data at the physical storage location.

Typically, adding the logical volume includes forming meta-data having a size that is independent of the given size of the logical volume.

There is further provided, according to an embodiment of the present invention, apparatus for managing multiple logical volumes in a data storage system, including:
physical storage of a given capacity; and
a control unit, which is adapted to:
add a logical volume of a given size within the data storage system so as to cause a total amount of logical storage of the logical volumes in the data storage system to be greater than the given capacity of the physical storage,
responsively to a write command to store data in the logical volume, verify that a physical storage location is available in the physical storage, and
if the physical storage location is available, then store the data at the physical storage location.

There is further provided, according to an embodiment of the present invention, apparatus for managing multiple logical volumes in a data storage system, including:
physical storage of a given capacity; and
a control unit, which is adapted:
responsively to a command to form a logical volume of a given size, to add a logical volume within the data storage system, to allocate to the logical volume an amount of physical storage less than the given amount of logical storage, and to form meta-data having a size that is independent of the size of the logical storage.

There is further provided, according to an embodiment of the present invention, apparatus for managing multiple logical volumes in a data storage system, including:
physical storage of a given capacity; and
a control unit, which is adapted:
responsively to a command to form a logical volume of a given size, to add the logical volume within the data storage system without allocating physical storage,
responsively to a write command to store data in the logical volume, to verify that a physical storage location is available in the physical storage, and
if the physical storage location is available, then to store the data at the physical storage location.

The present invention will be more fully understood from the following detailed description of the embodiments thereof, taken together with the drawings in which:

DETAILED DESCRIPTION OF EMBODIMENTS

Figure 1:
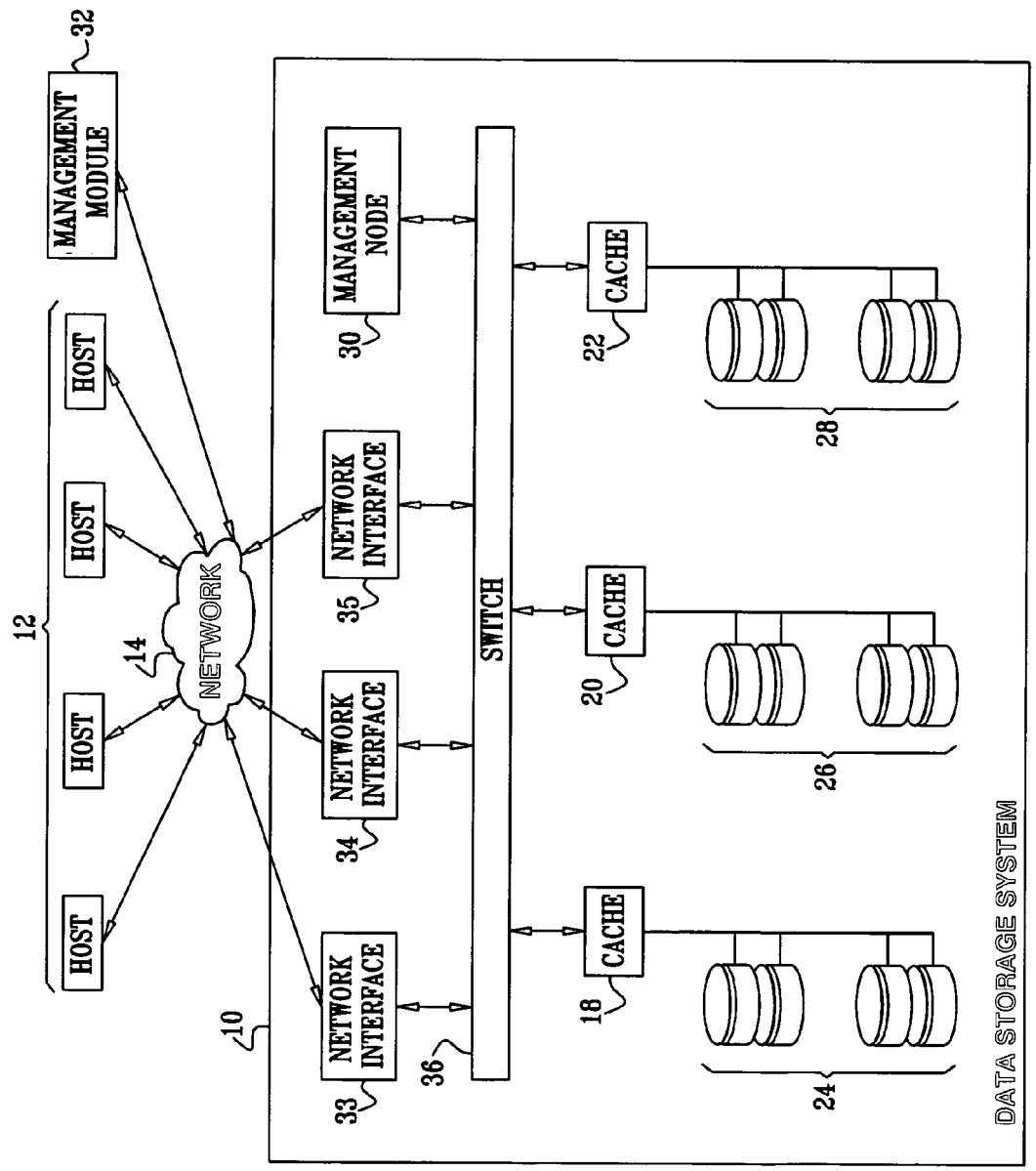
FIG. 1 is a schematic diagram of a data storage system, in accordance with an embodiment of the present invention.

Reference is now made to FIG. 1, which schematically illustrates a storage system 10, in accordance with an embodiment of the present invention. Storage system 10 receives, from one or more host computers 12, input/output (I/O) commands, comprising commands to read or write data at logical addresses on logical volumes. Host computers 12 are coupled to storage system 10 by any means known in the art, for example, via a network or by a bus. Herein, by way of example, host computers 12 and storage system 10 are assumed to be coupled by a network 14.

The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume V1.

Storage system 10 typically operates in, or as, a network attached storage (NAS) or a storage area network (SAN) system. However, it will be understood that the scope of the present invention is not limited to storage systems operating in any particular configuration. Rather, the scope of the present invention includes systems operating in any suitable configuration used for storing data.

I/O commands to read data comprise two fields, a first field specifying the command type (i.e., read), and a second field specifying the logical address, which includes the logical volume. I/O commands to write data comprise three fields, a first field specifying the command type (i.e., write), a second field specifying the logical address, and a third field specifying the data that is to be written.

Storage system 10 comprises one or more caches, indicated in FIG. 1 as caches 18, 20, and 22. However, it will be appreciated that the number of caches used in system 10 may be any convenient number. Caches 18, 20, and 22 are distinguished from each other to facilitate the exposition of cache operation hereinbelow. All caches in system 10 are assumed to operate in substantially the same manner and to comprise substantially similar elements. Elements in the caches of the system, and operations of the caches, are described in more detail below with respect to FIG. 2.

Each of the caches is assumed to be approximately equal in size and is also assumed to be coupled, by way of example, in a one-to-one correspondence with a set of physical storage. Those skilled in the art will be able to adapt the description herein, mutatis mutandis, to caches and storage devices in other correspondences, such as the many-to-many correspondence described in US Patent Publication 2005/0015566, titled "Data Allocation in a Distributed Storage System," which is assigned to the assignee of the present invention and which is incorporated herein by reference. Each set of physical storage comprises multiple slow and/or fast access time mass storage devices, hereinbelow assumed to be multiple hard disks. By way of example, FIG. 1 shows caches 18, 20, and 22 coupled to respective sets of physical storage 24, 26, and 28. In response to an I/O command, cache 18, by way of example, may read or write data at addressable physical locations of physical storage 24. A single addressable physical location, also referred to herein as a track, typically contains 128 data blocks.

In some embodiments of the present invention, a management node 30 of storage system 10 receives from a management module 32 a formation command to form a logical volume V1. The management module may be run from a dedicated external computing system or from one or more of the host computers. The purpose of the formation command is to permit host computers 12 to specify logical addresses of V1 in subsequent I/O commands.

In response to the formation command, management node 30 creates routing records which indicate how the logical addresses of V1 are to be distributed across caches 18, 20, and 22. The routing records do not specify the physical location on the disks of each logical address, but only the cache that is responsible for storing the associated data. In an embodiment of the present invention, the routing of logical addresses is implemented according to methods described in the above-referenced US Patent Publication 2005/0015566. According to the aforementioned methods, management node 30 assigns logical addresses to groups, herein referred to as partitions. Each partition may comprise a set of logical addresses equal in size to a track, namely 128 data blocks. Management node 30 determines the allocation of partitions among the one or more caches to provide an approximately equal number of partitions on each cache. The allocation is such that when data blocks of a logical volume are written to storage system 10, the blocks will be distributed in a balanced manner across all caches. Furthermore, the association of partitions with caches may be done in such a manner that the partitions of one logical volume associated with a specific cache, such as cache 18, may have the same identifying names, or numbers, as the partitions of additional logical volumes that are also associated with cache 18. That is, if a partition identified as P1 and comprising logical addresses of logical volume V1 is stored on cache 18, then partitions of additional volumes V2 and V3 with the identification of P1 may also be stored on cache 18.

The routing records, indicating the association of logical addresses of logical volumes with partitions and the association of the partitions with caches, are distributed by the management node to one or more generally similar network interfaces of storage system 10. The network interfaces are indicated in FIG. 1 as three network interfaces 33, 34, and 35, but it will be understood that system 10 may comprise any convenient number of network interfaces.

Figure 2:
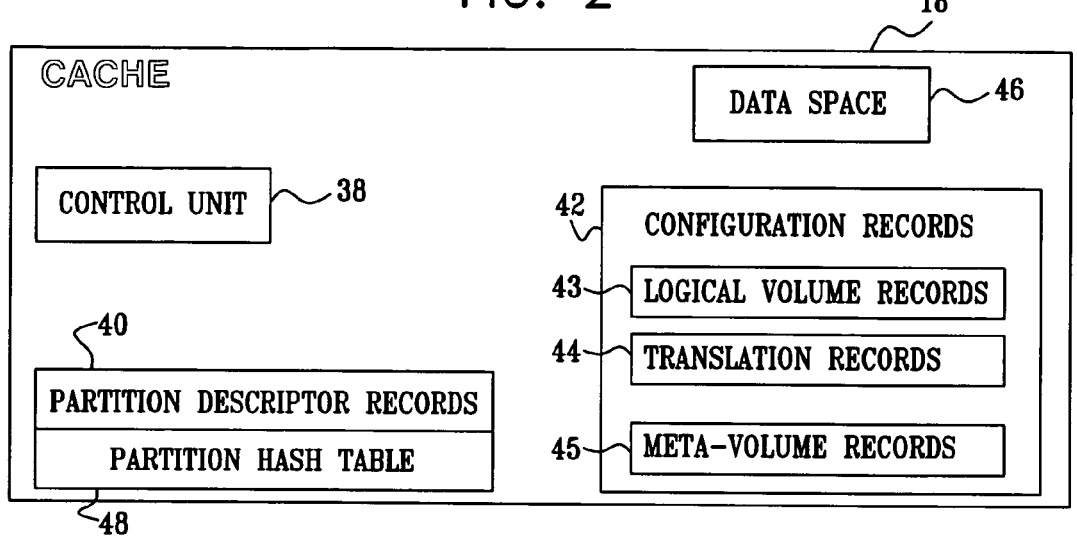
FIG. 2 is a schematic diagram of a cache in the data storage system of FIG. 1, in accordance with an embodiment of the present invention.

Referring back to the formation command to form volume V1, management node 30 also distributes messages to caches 18, 20, and 22 instructing the caches to form V1. Implementation of the formation command by the caches is described further hereinbelow (FIG. 2).

Subsequent to the formation of V1, network interfaces 33, 34, and 35 receive I/O commands from host computers 12 specifying logical addresses of V1. The network interfaces use the routing records to break the commands into I/O instructions, or command subsets, that are then distributed among caches 18, 20, and 22. By way of example, network interface 33 may receive a command to read data at a logical address comprising blocks 1000 through 1019 of logical volume V1. Network interface 33 uses the routing records to convert the logical address (which comprises 20 blocks) to partition addresses, such as a first partition address comprising blocks 125 through 128 on a partition P5 of cache 18, and a second partition address comprising blocks 1 through 16 on a partition P6 of cache 20.

Figure 4:
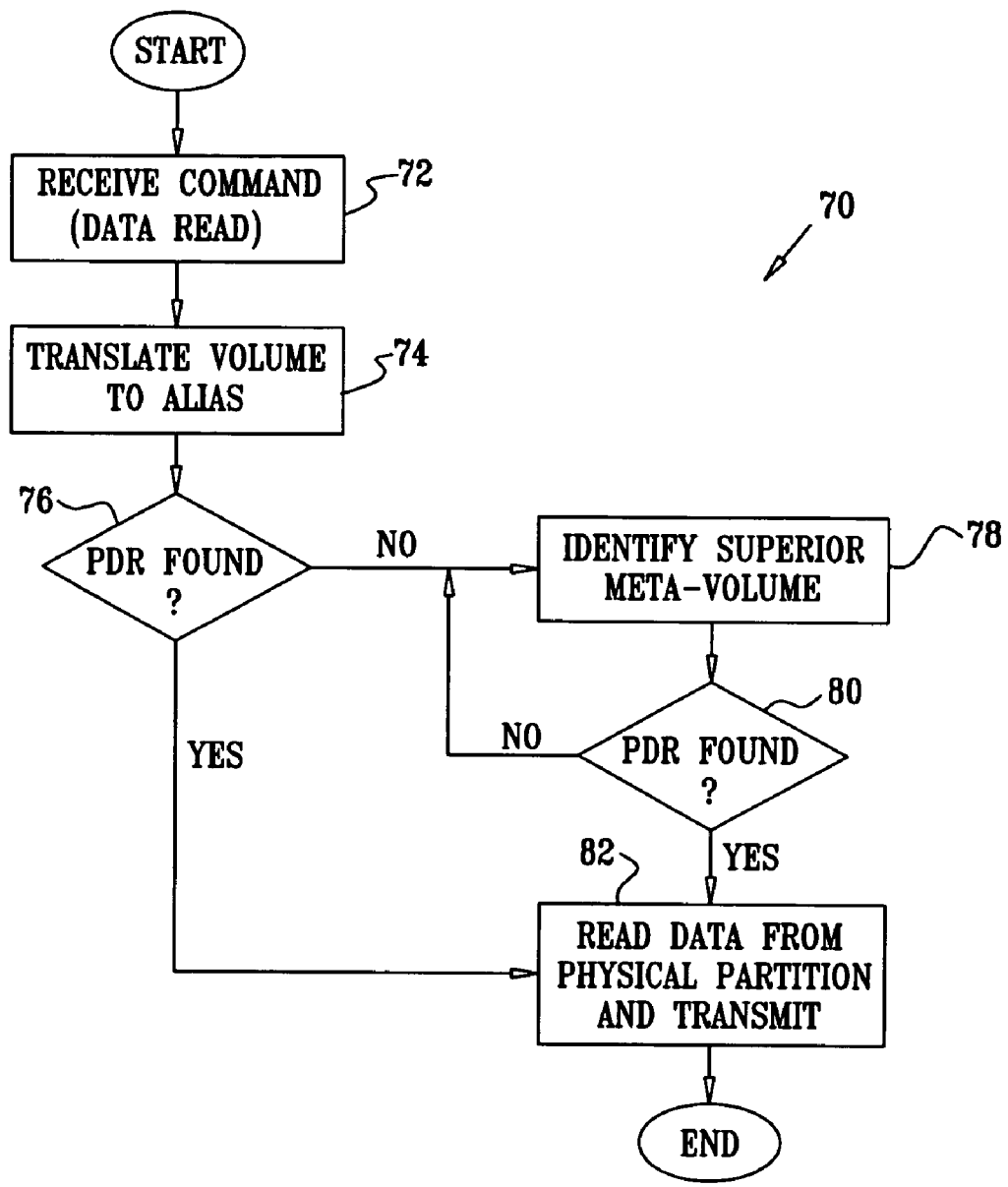
FIG. 4 is a flowchart of a process implemented when a data read command is received by the data storage system of FIG. 1, in accordance with an embodiment of the present invention.

Having determined the partition addresses associated with caches 18 and 20, network interface 33 then sends I/O instructions specifying the partition addresses to the respective caches 18 and 20. Each cache, upon receiving the respective instruction, then determines a physical location, i.e., a track, associated with the specified partition. Thus, following the example described above, cache 18 identifies the track associated with its partition P5, and cache 20 identifies the track associated with its partition P6. Each cache will then read data from the indicated track according to processes described further hereinbelow (FIG. 4).

Routing of commands from network interfaces 33, 34, and 35 to each cache is typically performed over a network and/or a switch. Herein, by way of example, the network interfaces are assumed to be coupled to the caches by a switch 36.

Figure 5:
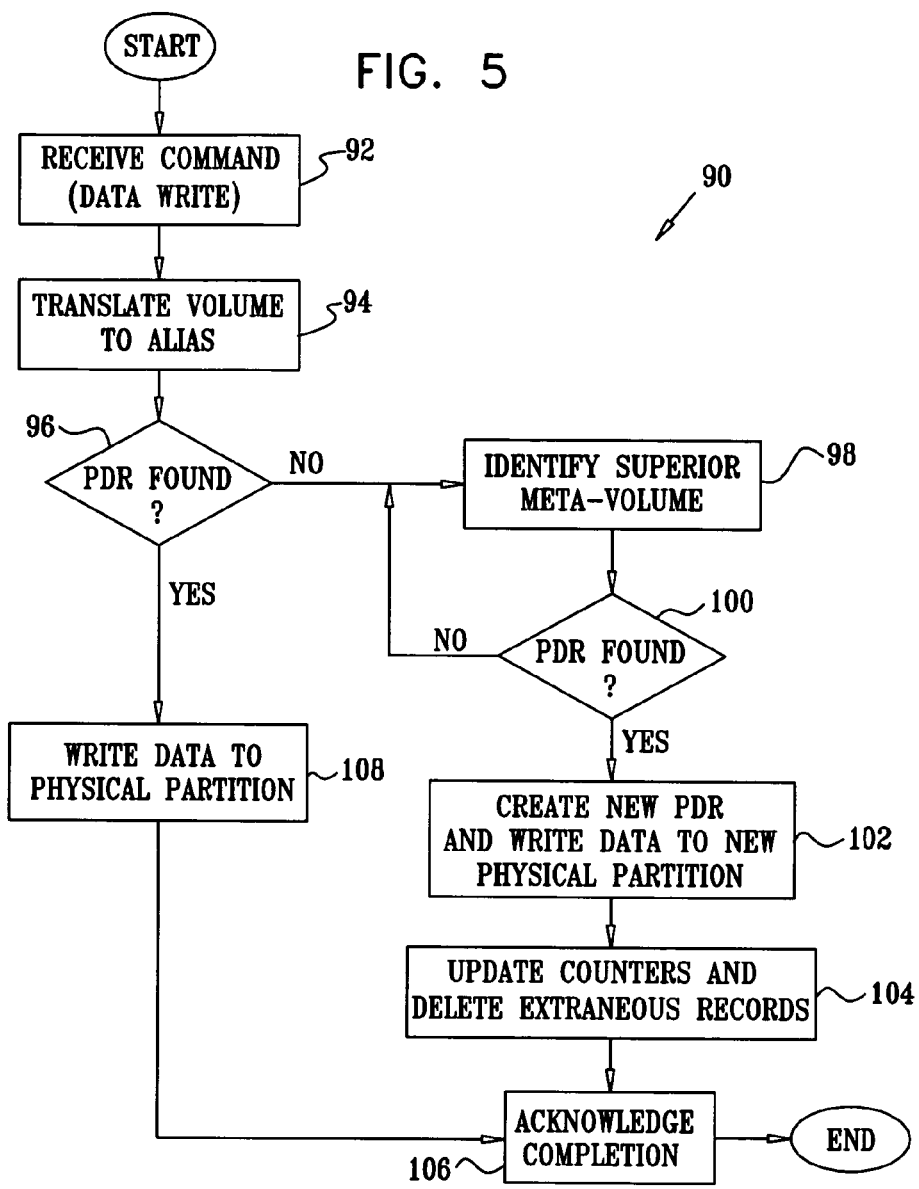
FIG. 5 is a flowchart of a process implemented when a data write command is received by the data storage system of FIG. 1, in accordance with an embodiment of the present invention.

FIG. 2 is a schematic diagram of elements of cache 18 of FIG. 1, in accordance with an embodiment of the present invention. A control unit 38 performs the processing and communications functions of the cache. The control unit manages communications with the network interfaces over switch 36. Alternatively, in configurations of the present invention in which storage system 10 comprises only a single cache 18, control unit 38 communicates directly with host computers 12 over network 14. Control unit 38 also performs the tasks of reading and writing data to physical storage 24. The control unit determines tracks of the physical storage at which to read and write data, performing this determination by using partition descriptor records 40, herein referred to as PDRs, and by using configuration records 42, according to processes described hereinbelow (FIGS. 4 and 5). The PDRs of cache 18 associate the partitions allocated to cache 18 with tracks of physical storage 24.

Control unit 38 also communicates with management node 30. In response to management instructions to form or to copy logical volumes, the control unit creates configuration records 42. Configuration records comprise logical volume records 43, translation records 44, and meta-volume records 45. Configuration records, as well as PDRs, which are collectively referred to as meta-data, may be managed using multiple data management paradigms, such as relational tables or binary trees. Cache 18 typically comprises non-volatile memory, such as random access memory (RAM), in which the meta-data may be stored. Alternatively or additionally, cache 18 may utilize external data storage, such as physical storage 24, for storing meta-data.

Cache 18 also comprises a data space 46, wherein data may be manipulated or temporarily stored during an I/O process. Cache 18 further comprises a partition hash table 48 used by control unit 38 to access PDRs.

An Appendix to the present disclosure, hereinbelow, details six sets of configuration records and PDRs of cache 18. Set 1 provides examples of configuration records and PDRs that may be defined in cache 18 when the data storage system stores three logical volumes, named respectively V1, V2, and V3. Sets 2 through 6 show how the configuration records and PDRs change during the implementation of I/O and management instructions.

As described above, the configuration records (i.e., logical volume records, translation records, and meta-volume records) are generated in response to instructions from management node 30. PDRs are created only in response to write instructions from the network interfaces.

As shown in Set 1, the first type of configuration records, the logical volume records, comprise three fields, these being a logical volume name field, a size field, measured in thousands of partitions, and a meta-volume field. It will be appreciated that the logical volume names used herein are for purposes of illustration only, as numeric values are typically used in computer communications. For clarity, additional fields comprised in a logical volume record, and which may be used for functions of the cache unrelated to the present invention, such as date and security key fields, are not shown.

Lines 1, 2, and 3 of Set 1 show the logical volume records for V1, V2, and V3. The logical volume records are created in response to volume formation instructions from the management node.

As indicated by the size fields of the aforementioned records, V1 and V3 have equivalent logical allocations of 100K partitions, which is approximately 6 gigabytes (GB). V2 is logically allocated 200K partitions. It should be noted that physical storage allocation in storage system 10 may be configured to operate in either a fixed allocation mode or a dynamic allocation mode. In a fixed allocation mode, management node 30 only implements a command to form or copy a logical volume if the physical storage coupled to the caches has free data space equal to or greater than the specified size of the logical volume. For example, a command from management module 32 to form logical volume V1 may specify a logical volume size of 18 GB. In the fixed allocation mode, the command is typically implemented by management node 30 only when caches 18, 20, and 22 have a total of at least 18 GB of free space available on their respective physical storage. By contrast, in the dynamic allocation mode, a logical volume may be formed substantially regardless of the amount of free data space available. Subsequently, caches may issue warnings to the management node when I/O operations cause free physical storage space to drop below a predetermined minimum.

The meta-volume fields of the three logical volume records (lines 1, 2, and 3) are either zero or null to indicate that the logical volumes are not associated with meta-volumes. The volumes are thus independent, meaning that they have not yet been used as a source or a target for logical volume copy commands, as described further hereinbelow.

Translation records of cache 18 (lines 4, 5, and 6) coincide with the abovementioned logical volume records and are also created by the formation command. Translation records comprise two fields, a volume field, within which may be written either a logical volume name or a meta-volume name, and an alias field, comprising an alias assigned to the volume or meta-volume. The translation records of Set 1 assign the alias A1 to V1, the alias A2 to V2, and the alias A3 to V3.

Set 1 shows several PDRs (lines 7 through 13) maintained by cache 18. During typical operation, the caches may maintain several hundred thousand PDRs or more. PDRs comprise four fields: an alias field, a partition name or identification (ID) field, a change counter field, and a physical address field. For example, in the PDR of line 7, the alias is A1, the partition identification is P1, the change counter is 0, and the physical address is PYYY01.

The change counter field of the PDRs is zero or null, as this field is only used for PDRs associated with meta-volumes, as described further hereinbelow.

In embodiments of the present invention, operating in either the fixed or the dynamic allocation mode, the partition descriptor records are created only when data is actually written to physical storage. Thus the resources required by cache 18 for meta-data are proportional to the amount of data actually stored, not to the amount of data allocated for logical volumes.

Meta-volume records do not appear in Set 1, as meta-volumes only exist after the data storage system has implemented a copy volume command, as described hereinbelow.

Figure 3:
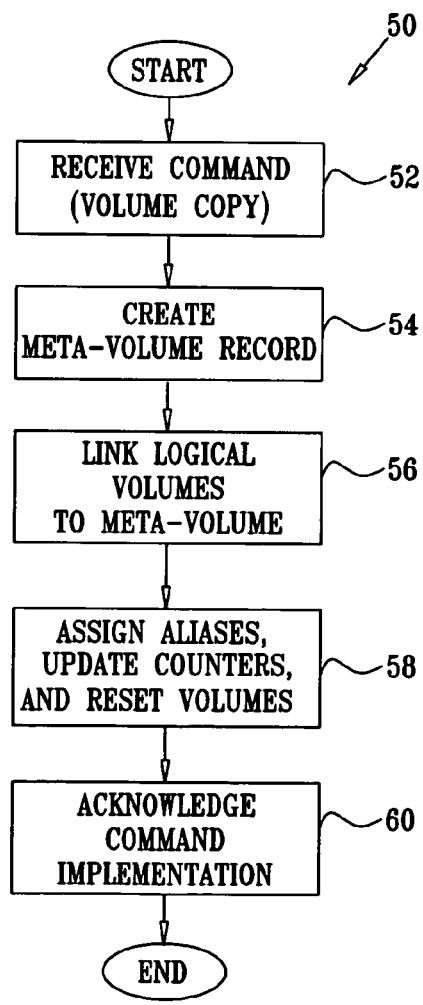
FIG. 3 is a flowchart of a process implemented when a copy volume command is received by the data storage system of FIG. 1, in accordance with an embodiment of the present invention.

FIG. 3 is a flowchart of a process 50 implemented when cache 18 receives an instruction to copy a source logical volume to a target logical volume, in accordance with an embodiment of the present invention.

At a step 52, cache 18 receives a copy instruction from management node 30 specifying that V3 is assigned as a copy of V1. Management node 30 issues this instruction after receiving the copy command from management module 32. In some embodiments, for example when a modular routing method described in US Patent Publication 2005/0015566 is utilized, routing records at the network interfaces may not need to be changed to facilitate implementation of V3 as a copy of V1. If routing records do need to be modified, management node 30 typically distributes new records as an atomic process.

Set 2 of the Appendix provides examples of the configuration records created by control unit 38 of cache 18 when the copy command is implemented. At a step 54, a meta-volume record (line 14 of Set 2) is created. The meta-volume record comprises four fields, a meta-volume field, which names the meta-volume, a size field, a logical volume counter, and a superior meta-volume field.

In the example indicated in Set 2, the meta-volume is created with the name MV1. The size is set equal to the size of the source volume V1, namely 100. The logical volume counter is set to 2, indicating that MV1 has two logical branch volumes, V1 and V3. Meta-volumes may be chained in a hierarchy; however, in Set 2, MV1 is not linked to any superior meta-volume. The superior meta-volume field is therefore blank or zero. Usage of the superior meta-volume field is described in further examples provided hereinbelow.

At a step 56, the meta-volume fields of both the V1 and V3 logical volume records are modified to associate both logical volumes with MV1 (lines 15 and 17 of Set 2). At an assign alias step 58, translation records are updated and created as necessary. A new translation record is created for MV1 (line 18). MV1 is assigned the alias A1, which was previously assigned to the source volume V1. V1 is assigned a new alias A4 (line 19).

As shown in Set 2, cache 18 creates no new PDRs in response to the copy command. However, because V3 is reset to reflect the data of V1, the PDRs previously associated with V3 (i.e., the PDRs associated with alias A3, in lines 12 and 13) are deleted (as indicated by the comment "Deleted" in lines 27 and 28).

In the event that steps 52 through 58 have completed successfully, cache 18 provides management node 30 with an acknowledgement of success at a step 60, after which process 50 is complete. Subsequently, management node 30, responsively to acknowledgements from all caches 18, 20, and 22, sends an acknowledgement to management node 32.

It will be understood that implementation of the copy command may be configured within storage system 10 to be an atomic process. It will also be understood that the duration of the process is independent of the size of the volume being copied, and that the process is substantially instantaneous since the only activities performed are generation or updating of a few configuration records. As is shown further below, the properties of atomicity, size independence, and instantaneity apply no matter how many copies of a volume are made.

FIG. 4 is a flowchart of a process 70 implemented by cache 18 upon receiving an instruction to read data, subsequent to implementing process 50, in accordance with an embodiment of the present invention. At an initial step 72, control unit 38 of cache 18 receives a data read instruction from one of network interfaces 33, 34, and 35, the instruction typically being generated in response to a read command from one of host computers 12. By way of example, the instruction is assumed to be received from network interface 33. The instruction is further assumed to be a request to read data at blocks 125 through 128 of partition P1 of V1.

At a translation step 74, control unit 38 translates the logical volume name V1 to the alias A4, according to the V1 translation record (line 19 of Set 2). At a subsequent decision step 76, the control unit determines whether there exists a PDR associated with P1 of A4, i.e., a PDR in which the value of the partition ID field is P1 and the value of the alias field is A4. Partition hash table 48 (FIG. 2) is used to facilitate the search through the PDR records, since, as stated above, there are typically many records.

Assuming the meta-data status indicated by Set 2, no PDR exists for P1 of A4. The "no" branch of step 76 is therefore followed, and processing continues at a step 78. At this step, control unit 38 checks the meta-volume link for V1, i.e., the meta-volume field of the V1 logical volume record (line 15 of Set 2). The record shows that V1 is linked to MV1. The translation record for MV1 (line 18) associates MV1 with alias A1.

Processing continues at decision step 80, at which the control unit seeks a PDR for P1 associated with alias A1. As in step 76, partition hash table 48 is used to facilitate the search through the PDR records.

A PDR does exist for P1 of A1 (line 22 of Set 2). Processing thus continues at a read data step 82, rather than reiterating steps 78 and 80. At step 82, the control unit reads data into data space 46 from the track PYYY01 indicated by the PDR. The control unit then outputs blocks 125 through 128 of the track to network interface 33, thereby satisfying the request of the read instruction and completing process 70.

It will be understood that the same process flow would be followed to implement an instruction requesting data from partition P1 of V3, the second branch of MV1. By contrast, an instruction specifying data of partition P1 of logical volume V2 would be processed without following the meta-volume link in step 78, because a PDR exists for P1 of V2 (line 25 of Set 2). Consequently, the PDR would be found at decision step 76, and processing would continue directly to read data step 82.

FIG. 5 is a flowchart of a process 90 implemented by cache 18 upon receiving an instruction to write data, subsequent to implementing process 50, in accordance with an embodiment of the present invention. Prior to implementation of process 90, Set 2 is assumed to reflect the status of meta-data of cache 18. Following implementation of process 90, the meta-data status is reflected by Set 3.

Implementation of the write instruction by process 90 is similar to implementation of the read instruction carried out through process 70 of FIG. 4. At an initial step 92, control unit 38 of cache 18 receives a data write instruction from one of network interfaces 33, 34, and 35. By way of example, the instruction is assumed to be received from network interface 33. Furthermore, for the sake of illustration, the instruction is assumed to be derived from a write command specifying data that is to be written to blocks 125 through 128 of partition P1 of V1.

At a translation step 94, control unit 38 of cache 18 translates logical volume V1 to alias A4, according to the V1 translation record (line 19 of Set 2). Next, at a decision step 96, control unit 38 determines whether there exists a PDR associated with P1 of A4. As described above, partition hash table 48 (FIG. 2) is used to facilitate the search through the PDR records.

Because no PDR exists for P1 of A4, processing continues at a step 98. The meta-volume field of the V1 logical volume record (line 15 of Set 2) associates V1 with the meta-volume MV1, whose alias is A1. Processing continues at a decision step 100, at which the control unit seeks a PDR for P1 of MV1 (specified by the alias A1).

This PDR does exist (line 22 of Set 2), and specifies that the data is stored at a track PYYY01. Processing thus continues at a write data step 102. This step comprises first reading the 128 blocks of track PYYY01 into data space 46 and then modifying the data at blocks 125 through 128, according to the data received from the network interface, so that the modified partition can then be rewritten to physical storage.

At this point, the modified partition cannot be written back to track PYYY01, because another branch of the meta-volume (i.e., V3) still references the unmodified data at track PYYY01. Consequently, a new track is allocated to store the new data partition. A new PDR is created (line 42 of Set 3), indicating that the new data is stored at a track PYYY06.

At an update step 104, the change counter field of the PDR of P1 of MV1 (line 37 of Set 3), is incremented from zero to one, to reflect that one of the branches of MV1, i.e., V1, no longer references this PDR. When the P1 partitions of all logical volumes referencing MV1 have been modified, the P1 PDR of MV1 may be deleted. Furthermore, when all partitions referencing MV1 have been modified, the meta-volume itself may be deleted.

Assuming that all prior steps have been completed successfully, cache 18 returns an acknowledgement of successful completion to network interface 33 at step 106.

After the P1 PDR of V1 has been created, a subsequent command to write to this P1 partition will be implemented by accessing the PDR with the new V1 alias A4, rather than by using the MV1 alias. In other words, the control unit will identify the PDR at the first PDR search step 96, and implementation of process 90 will continue at a step 108, at which the new data will be written to the same physical location as that indicated by the PDR, namely PYYY06.

Figure 6:
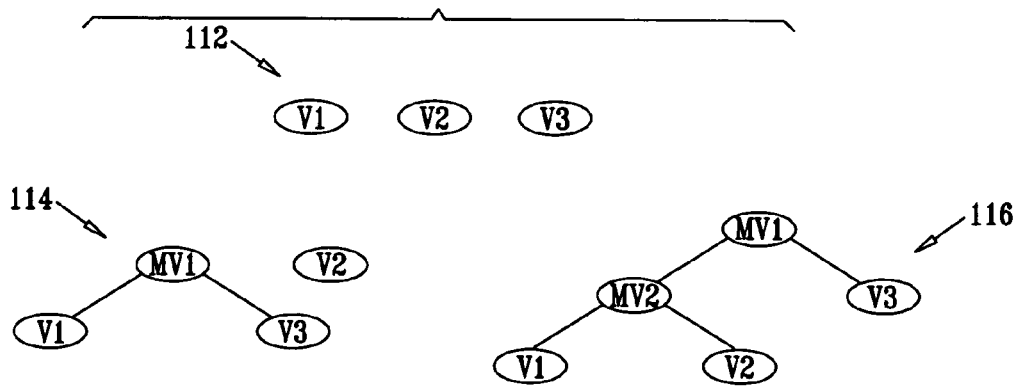
FIG. 6 is an exemplary diagram of hierarchies of meta-volumes, in accordance with an embodiment of the present invention.

FIG. 6 displays three exemplary diagrams of relationships between logical volumes and meta-volumes, in accordance with an embodiment of the present invention. In a first diagram 112, the three logical volumes V1, V2, and V3 are shown as independent entities, corresponding to a state indicated by Set 1 of the Appendix. A second diagram 114 shows the hierarchical relationship created after a logical volume copy command is performed, designating V3 as a copy of V1, and corresponds to a state indicated by Set 2 of the Appendix. As shown, V1 and V3 become branches of MV1, while V2 remains independent.

Below are descriptions of further applications of processes 70 and 90 (FIGS. 4 and 5) illustrating how PDRs and configuration records are modified.

Assuming that the records of cache 18 are as shown in Set 3 of the Appendix, upon receiving a second copy command designating V2 as a copy of V1, control unit 38 creates a second meta-volume, MV2. To implement the second copy command, the control unit again follows process 50, creating a meta-volume record for MV2, updating links of the logical volumes to reference MV2, and creating new aliases for MV2 and for V1. Set 4 of the Appendix shows the specific modifications made to the configuration records. At step 54, an MV2 record is created (line 44 of Set 4), and the "superior meta-volume" field of the newly created MV2 record is set to MV1. The logical volume counter for MV2 is set to two, indicating the two branches of MV2, V1 and V2. The logical volume counter for MV1 is incremented to three (line 43), indicating that three logical volumes all originate from the same initial source and reference data indicated by PDRs of MV1. The size of MV2 is set equal to the size of V1. Note that V2 is larger than V1, which means that V2 may store more data than was planned for V1.

Further modifications to the configuration records of cache 18 comprise assigning MV2 to the meta-volume fields of the V1 and V2 logical volume records at step 56 (lines 45 and 46), and revising the translation records to assign new aliases at step 58. MV2 is assigned the prior alias V1, namely A4 (line 49), and V1 is assigned a new alias A5 (line 50). Changes to the PDRs comprise deleting former PDRs of V2, because V2 is reset to reflect the data of V1, and incrementing the change counter of the P1 PDR of MV1 (line 53), because the P1 partition of V1 does not reference this PDR.

As indicated in a third diagram 116 of FIG. 6, implementation of the second copy command causes MV2 to take the place of V1 as a subordinate volume of MV1. It may be understood from the description above that additional meta-volumes may be added to the hierarchy represented by diagram 116, such that an extremely large chain of copies may be generated. The only resources utilized by each copy are the few bytes required for the additional configuration records.

It may be further understood that process 90 illustrates a "bottom-up" algorithm for seeking a PDR, whereby the iterative search begins by seeking a PDR associated with the logical volume (step 96), and then continues by iteratively seeking PDRs associated with superior meta-volumes. Alternatively, a "top-down" algorithm may be used, whereby a PDR is first sought for the most superior meta-volume of a logical volume (e.g., MV1 is the most superior meta-volume of V1 in diagram 116 of FIG. 6). Subsequently, each subordinate volume is checked until the PDR is found.

After implementing the second copy command, control unit 38 may receive further write commands, which again trigger process 90 of FIG. 5. Set 5 of the Appendix shows PDRs that are defined by control unit 38 after subsequent write instructions have been implemented, rewriting partitions P5 of V1, V2, and V3. Before the implementation of these write instructions the three P5 partitions are associated with MV1 and stored at a physical location PYYY02 (line 38). Following implementation of the write instructions, new physical locations are used to store the three partitions, as indicated by the three new PDRs at lines 73 through 75 of Set 5.

After each successive write, the control unit increments the change counter of the P5 PDR of MV1 (line 70), such that the change counter is incremented to 3. Control unit 38 compares the change counter with the MV1 logical volume counter (line 57 of Set 5), to determine whether the PDR is referenced by subordinate volumes. In this case, the counters are equal, indicating that the P5 PDR of MV1 is not needed. The PDR is thus deleted (as indicated by the comment, "Deleted" on line 70).

Set 6 of the Appendix lists configuration records of cache 18 after additional write commands are implemented, causing P1 partitions of V1 and of V2 to be modified. After the partitions for both these branches of MV2 have been changed, the P1 PDR of MV2 (with alias A4, on line 88) has a change counter value of 2, equal to the logical volume counter of the MV2 meta-volume record (line 77). Consequently, the PDR is no longer needed and is deleted by control unit 38 (indicated by the comment "Deleted" on line 88).

Because this is the only PDR associated with MV2, the meta-volume record itself (line 77) and the translation record (line 82) for MV2 are also deleted (as indicated by the comment "Deleted" on the respective lines in Set 6). Finally, the logical volume records for V1 and V2, which formerly referenced MV2 in their meta-volume field (lines 61 and 62 of Set 5), and are linked instead to MV1 (lines 78 and 79).

Figure 7:
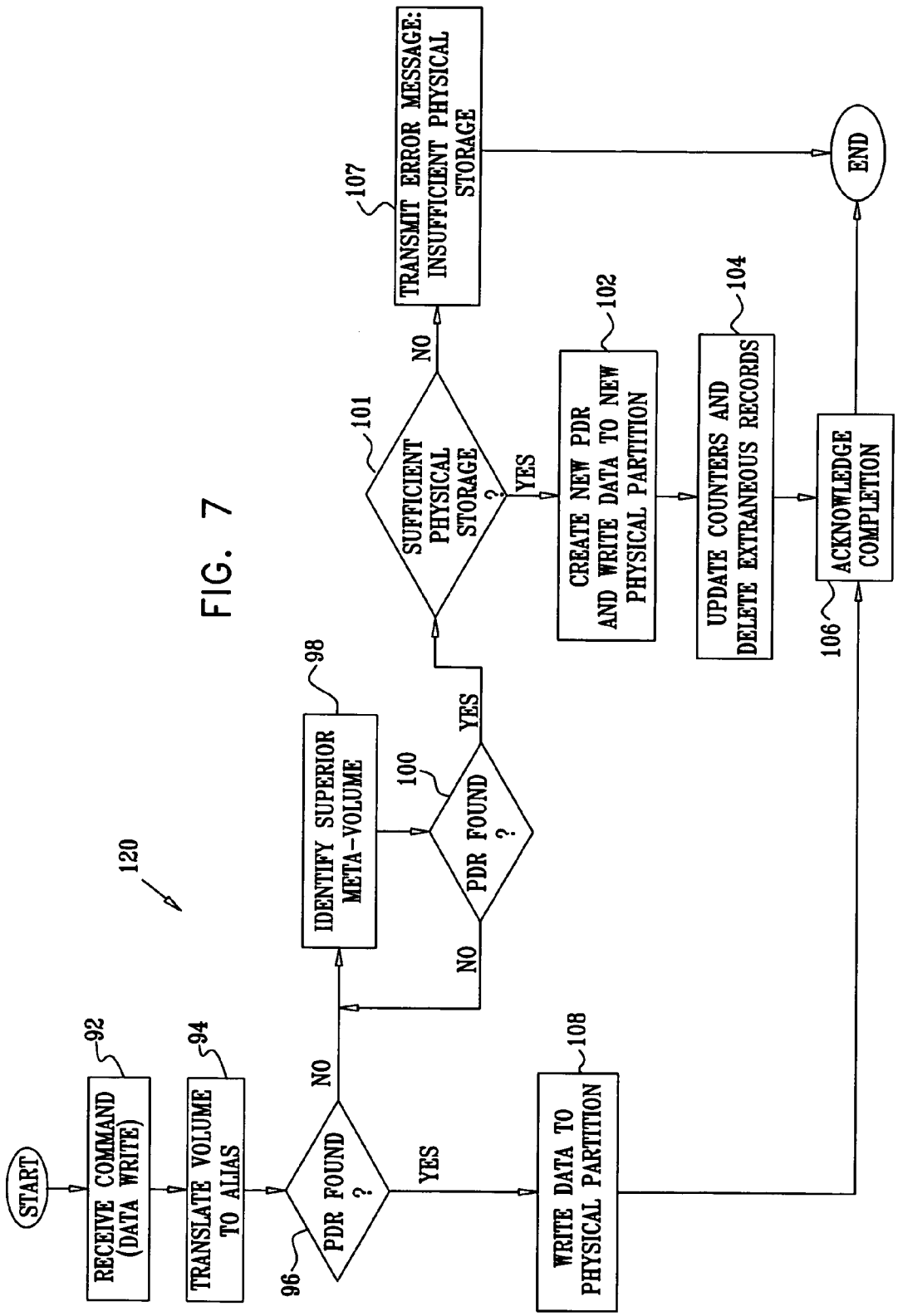
FIG. 7 is a flowchart of a process similar to that shown in FIG. 5, providing more detail of a dynamic storage implementation, in accordance with an embodiment of the present invention.

FIG. 7 is a flowchart of a process 120 similar to process 90 of FIG. 5, in accordance with an embodiment of the present invention. Process 120 indicates two additional steps not delineated in FIG. 5 that must be performed to implement a data write command when the storage system operates in dynamic allocation mode. These steps are a physical storage verification step 101 and an error notification step 107.

When dynamic allocation mode is supported, no allocation or verification of physical storage is performed when a logical volume is defined, but rather physical storage allocation is performed when write commands are received from a host computer. Consequently, insufficient space may exist on physical storage 24 when cache 18 attempts to write new data. Therefore, before new physical storage space may be allocated at step 102 of process 120 (step 102 of process 90 in FIG. 5), a verification of sufficient free physical space is performed at step 101. If sufficient space exists, processing continues at step 102, as described in FIG. 5. If there is insufficient physical storage space, then processing following step 101 continues at error notification step 107, at which cache 18 returns an error message to network interface 33. The data storage system may also be configured in such a manner that an error message is simultaneously returned to management module 32. Following step 107, process 120 is complete.

It may be understood that when multiple copies of a logical volume are needed to perform testing that will change only a small amount of source data, the present invention, with dynamic allocation of physical storage space as described hereinabove, is especially efficient. The storage system may support a very large number of logical volumes copies, comprising, in total, a very large amount of logical storage, because the addition of these logical volumes to the storage system does not increase the amount of physical storage allocated. As the data in these logical volumes is changed, only the changed data causes new physical storage to be allocated.

The formation of a logical volume copy occurs within a period of time that is virtually instantaneous, because only a meta-volume record and a translation record are created. Furthermore, because no PDR records are created upon formation of a logical volume copy, the amount of time required to form the logical volume copy is independent of the size of the logical volume copy.

When data is written to the logical volume copy, the number of PDRs created is equal to the number of changed partitions, and the amount of storage needed for metadata is therefore approximately proportional to the amount of storage needed for changed data. Typically, the ratio of data storage to metadata storage will be approximately constant. Variations in the ratio may arise because PDRs may be aggregated into tracks, in which case new storage for a PDR is only allocated if sufficient storage space is not available on an existing track.

Although the embodiments described hereinabove relate to a distributed data storage system serving host computers over a network, it will be appreciated that the principles of the present invention may also be applied, mutatis mutandis, to storage systems in other configurations, such as stand-alone systems serving individual or multiple hosts. Furthermore, although the association of a meta-volume with tracks is implemented hereinabove by translation records, other methods of association may be envisioned. For example, the partition descriptor records may include a volume ID field rather than an alias field, and a copy command may be implemented by changing the field in each PDR to reflect a meta-volume ID. The methods described hereinabove may also be applied to additional data storage management commands such as a command to copy a source volume to multiple target volumes, some of which may be read-only volumes. It will thus be appreciated that the embodiments described above are cited by way of example, and the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

APPENDIX

Set 1: Sample configuration records for three logical volumes, V1, V2 and V3. No logical volume is linked to a meta-volume.

| Line # | Logical Volume Records | | | |
|---|---|---|---|---|
| | Logical Volume | Size | Meta-Volume | Comments |
| 1 | V1 | 100 | 0 | |
| 2 | V2 | 200 | 0 | |
| 3 | V3 | 100 | 0 | |

| | Translation Records | | |
|---|---|---|---|
| | Volume | Alias | Comments |
| 4 | V1 | A1 | |
| 5 | V2 | A2 | |
| 6 | V3 | A3 | |

| | Partition Descriptor Records | | | |
|---|---|---|---|---|
| | Alias | Partition ID | Change counter | Physical Address | Comments |
| 7 | A1 | P1 | 0 | PYYY01 | |
| 8 | A1 | P5 | 0 | PYYY02 | |
| 9 | A1 | P9 | 0 | PYYY03 | |
| 10 | A2 | P1 | 0 | PYYY04 | |
| 11 | A2 | P5 | 0 | PYYY05 | |
| 12 | A3 | P1 | 0 | PYYY06 | |
| 13 | A3 | P5 | 0 | PYYY07 | |

Set 2: Sample records for logical volumes, V1, V2, and V3, after V3 is designated a copy of V1. V1 and V3 are designated as branches of a common meta-volume, MV1. PDRs of V3 are deleted.

| Line # | Meta-Volume Records | | | | |
|---|---|---|---|---|---|
| | Meta-Volume | Size | Logical Volume counter | Superior Meta-Volume | Comments |
| 14 | MV1 | 100 | 2 | 0 | New record |

| | Logical Volume Records | | | |
|---|---|---|---|---|
| | Logical Volume | Size | Meta-Volume | Comments |
| 15 | V1 | 100 | MV1 | Modified |
| 16 | V2 | 200 | 0 | |
| 17 | V3 | 100 | MV1 | Modified |

Translation Records

| Line # | Volume | Alias | Comments |
|---|---|---|---|
| 18 | MV1 | A1 | New record |
| 19 | V1 | A4 | Modified |
| 20 | V2 | A2 | |
| 21 | V3 | A3 | |

Partition Descriptor Records

| Line # | Alias | Partition ID | Change counter | Physical Address | Comments |
|---|---|---|---|---|---|
| 22 | A1 | P1 | 0 | PYYY01 | |
| 23 | A1 | P5 | 0 | PYYY02 | |
| 24 | A1 | P9 | 0 | PYYY03 | |
| 25 | A2 | P1 | 0 | PYYY04 | |
| 26 | A2 | P5 | 0 | PYYY05 | |
| 27 | A3 | P1 | 0 | PYYY06 | Deleted |
| 28 | A3 | P5 | 0 | PYYY07 | Deleted |

Set 3: Sample records after writing to partition P1 of V1 (A4).

Meta-Volume Records

| Line # | Meta-Volume | Size | Logical Volume counter | Superior Meta-Volume | Comments |
|---|---|---|---|---|---|
| 29 | MV1 | 100 | 2 | 0 | |

Logical Volume Records

| Line # | Logical Volume | Size | Meta-Volume | Comments |
|---|---|---|---|---|
| 30 | V1 | 100 | MV1 | |
| 31 | V2 | 200 | 0 | |
| 32 | V3 | 100 | MV1 | |

Translation Records

| Line # | Volume | Alias | Comments |
|---|---|---|---|
| 33 | MV1 | A1 | |
| 34 | V1 | A4 | |
| 35 | V2 | A2 | |
| 36 | V3 | A3 | |

Partition Descriptor Records

| Line # | Alias | Partition ID | Change Counter | Physical Address | Comments |
|---|---|---|---|---|---|
| 37 | A1 | P1 | 1 | PYYY01 | Modified |
| 38 | A1 | P5 | 0 | PYYY02 | |
| 39 | A1 | P9 | 0 | PYYY03 | |
| 40 | A2 | P1 | 0 | PYYY04 | |
| 41 | A2 | P5 | 0 | PYYY05 | |
| 42 | A4 | P1 | 0 | PYYY06 | New record |

Set 4: Sample records of logical volumes, V1, V2, and V3, after V2 is designated a copy of V1. PDRs of V2 (A2) are deleted.

Meta-Volume Records

| Line # | Meta-Volume | Size | Logical Volume counter | Superior Meta-Volume | Comments |
|---|---|---|---|---|---|
| 43 | MV1 | 100 | 3 | 0 | Modified |
| 44 | MV2 | 100 | 2 | MV1 | New record |

Logical Volume Records

| Line # | Logical Volume | Size | Meta-Volume | Comments |
|---|---|---|---|---|
| 45 | V1 | 100 | MV2 | Modified |
| 46 | V2 | 200 | MV2 | Modified |
| 47 | V3 | 100 | MV1 | |

Translation Records

| Line # | Volume | Alias | Comments |
|---|---|---|---|
| 48 | MV1 | A1 | |
| 49 | MV2 | A4 | New record |
| 50 | V1 | A5 | Modified |
| 51 | V2 | A2 | |
| 52 | V3 | A3 | |

Partition Descriptor Records

| Line # | Alias | Partition ID | Change Counter | Physical Address | Comments |
|---|---|---|---|---|---|
| 53 | A1 | P1 | 2 | PYYY01 | Modified |
| 54 | A1 | P5 | 0 | PYYY02 | |
| 55 | A1 | P9 | 0 | PYYY03 | |
| 56 | A2 | P1 | 0 | PYYY04 | Deleted |
| 57 | A2 | P5 | 0 | PYYY05 | Deleted |
| 58 | A4 | P1 | 0 | PYYY06 | |

Set 5: Sample records after writing to partitions P5 of V1 (A5), V2 (A2), and V3 (A3). PDR for P5 of MV1 (A1) is deleted because change counter equals logical volume counter.

Meta-Volume Records

| Line # | Meta-Volume | Size | Logical Volume counter | Superior Meta-Volume | Comments |
|---|---|---|---|---|---|
| 59 | MV1 | 100 | 3 | 0 | |
| 60 | MV2 | 100 | 2 | MV1 | |

Logical Volume Records

| Line # | Logical Volume | Size | Meta-Volume | Comments |
|---|---|---|---|---|
| 61 | V1 | 100 | MV2 | |
| 62 | V2 | 200 | MV2 | |
| 63 | V3 | 100 | MV1 | |

Translation Records

| Line # | Volume | Alias | Comments |
|---|---|---|---|
| 64 | MV1 | A1 | |
| 65 | MV2 | A4 | |

-continued

| Line # | | |
|---|---|---|
| 66 | V1 | A5 |
| 67 | V2 | A2 |
| 68 | V3 | A3 |

Partition Descriptor Records

| Line # | Alias | Partition ID | Change Counter | Physical Address | Comments |
|---|---|---|---|---|---|
| 69 | A1 | P1 | 2 | PYYY01 | |
| 70 | A1 | P5 | 3 | PYYY02 | Deleted |
| 71 | A1 | P9 | 0 | PYYY03 | |
| 72 | A4 | P1 | 0 | PYYY06 | |
| 73 | A5 | P5 | 0 | PYYY04 | New record |
| 74 | A2 | P5 | 0 | PYYY05 | New record |
| 75 | A3 | P5 | 0 | PYYY07 | New record |

Set 6: Sample records after writing to partitions P1 of V1 (A5) and V2 (A2). PDR for P1 of MV2 (A3) is deleted, and meta-volume and translations records for MV2 are deleted.

Meta-Volume Records

| Line # | Meta-Volume | Size | Logical Volume counter | Superior Meta-Volume | Comments |
|---|---|---|---|---|---|
| 76 | MV1 | 100 | 3 | 0 | |
| 77 | MV2 | 100 | 2 | MV1 | Deleted |

Logical Volume Records

| Line # | Logical Volume | Size | Meta-Volume | Comments |
|---|---|---|---|---|
| 78 | V1 | 100 | MV1 | Modified |
| 79 | V2 | 200 | MV1 | Modified |
| 80 | V3 | 100 | MV1 | |

Translation Records

| Line # | Volume | Alias | Comments |
|---|---|---|---|
| 81 | MV1 | A1 | |
| 82 | MV2 | A4 | Deleted |
| 83 | V1 | A5 | |
| 84 | V2 | A2 | |
| 85 | V3 | A3 | |

Partition Descriptor Records

| Line # | Alias | Partition ID | Change Counter | Physical Address | Comments |
|---|---|---|---|---|---|
| 86 | A1 | P1 | 2 | PYYY01 | |
| 87 | A1 | P9 | 0 | PYYY03 | |
| 88 | A4 | P1 | 2 | PYYY06 | Deleted |
| 89 | A5 | P5 | 0 | PYYY04 | |
| 90 | A2 | P5 | 0 | PYYY05 | |
| 91 | A3 | P5 | 0 | PYYY07 | |
| 92 | A5 | P1 | 0 | PYYY08 | New record |
| 93 | A2 | P1 | 0 | PYYY09 | New record |

We claim:

1. A method for managing multiple logical volumes in a data storage system, comprising:

providing physical storage of a given capacity within the data storage system;

adding a first logical volume of a given size within the data storage system;

creating partition descriptor records (PDRs) that link partitions of the logical volumes to physical addresses;

forming meta-volumes configured to reference the PDRs and to be chained in a hierarchy;

copying the first logical volume to a second logical volume;

in response to copying the first logical volume, forming a meta-volume record comprising a logical volume counter indicative of a total number of the logical volumes linked in the hierarchy to a given meta-volume, forming a first logical volume record linking the first logical volume to the given meta-volume, and forming a second logical volume record linking the second logical volume to the given meta-volume;

forming a first PDR that links a given partition of the first logical volume to a first physical address, the first PDR comprising a change counter indicative of a number of the logical volumes not referencing the first PDR;

responsively to a write command to store data in the given partition, traversing the hierarchy to locate the first PDR;

when the first PDR is referenced by the given meta-volume:

incrementing the change counter, forming a second PDR, identifying a second physical address of a second physical storage location, linking, using the second PDR, the given partition to the second physical address, and storing the data at the second physical storage location; and when the logical volume counter and the change counter of the first PDR are equal, deleting the first PDR.

2. The method of claim 1, wherein the meta-volume record has a size that is independent of sizes of the logical volumes linked to the meta-volume.

3. The method of claim 1, wherein storing the data comprises:

allocating a quantity of physical storage tracks; and creating further partition descriptor records (PDRs), such that the quantity of physical storage tracks is proportional to a quantity of PDRs.

4. The method of claim 3, wherein a ratio of the quantity of physical storage tracks to the quantity of PDRs is equal to a constant.

5. The method of claim 3, and comprising responsively to a read command, accessing the data at the second physical storage location using at least one of the quantity of PDRs.

6. The method according to claim 1, wherein a total amount of logical storage of the logical volumes in the data storage system is greater than the given capacity.

* * * * *